No. 852,183. PATENTED APR. 30, 1907.
F. C. HOWE.
WEIGHING SCOOP.
APPLICATION FILED OCT. 5, 1906.
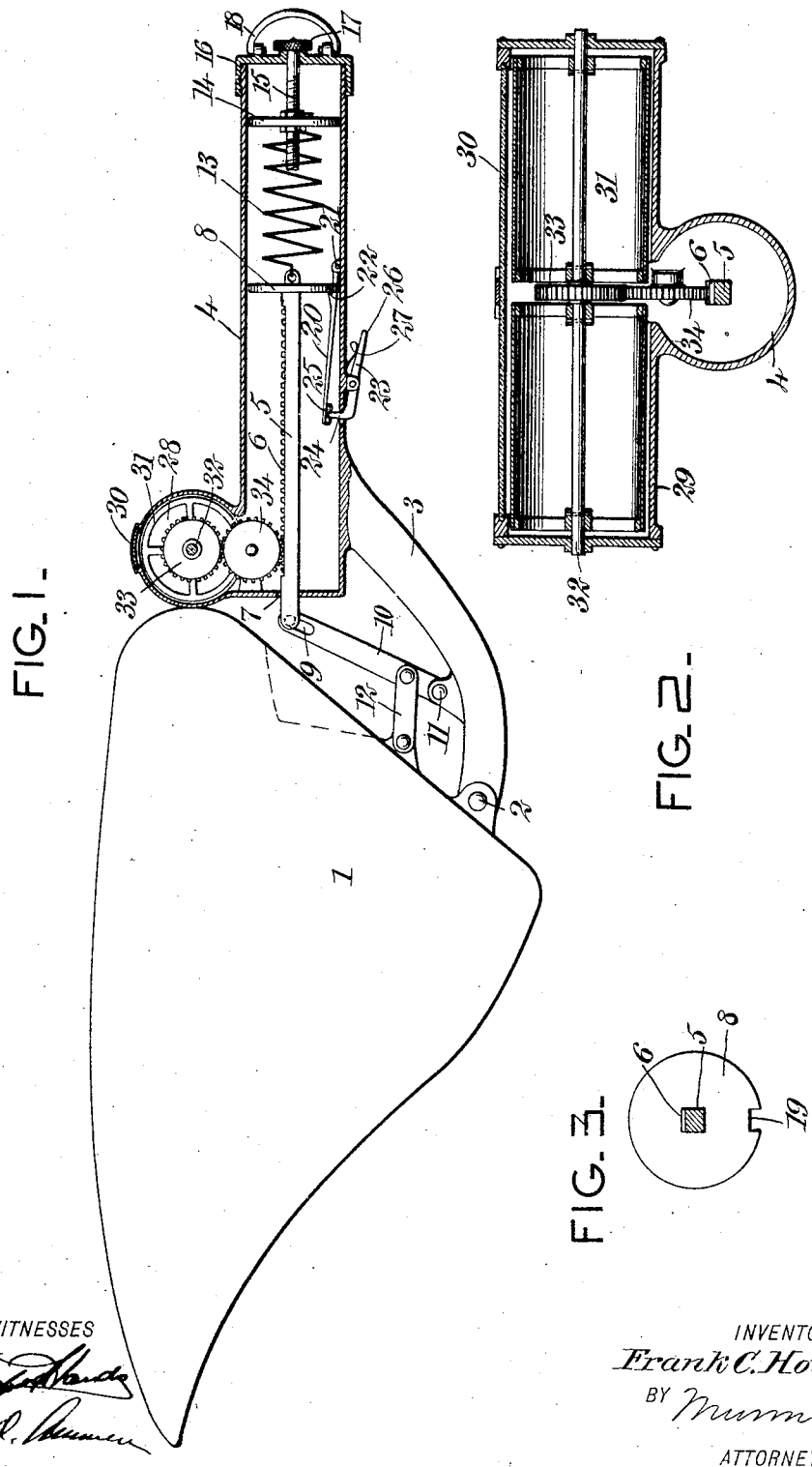
WITNESSES
INVENTOR
Frank C. Howe
BY Munn & Co
ATTORNEYS

UNITED STATES PATENT OFFICE.

FRANK C. HOWE, OF EL PASO, TEXAS.

WEIGHING-SCOOP.

No. 852,183.  Specification of Letters Patent.  Patented April 30, 1907.

Application filed October 5, 1906. Serial No. 337,560.

*To all whom it may concern:*

Be it known that I, FRANK C. HOWE, a citizen of the United States, and a resident of El Paso, in the county of El Paso and State of Texas, have invented a new and Improved Weighing-Scoop, of which the following is a full, clear, and exact description.

This invention relates to scoops such as used in stores or similar places, in selling food products such as flour, sugar, etc.

The object of the invention is to produce a scoop having weighing mechanism provided with an indicating attachment which will give the scoop a wide range of usefulness, enabling it to weigh articles varying greatly in their prices per pound.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the scoop, the handle and the weighing mechanism being shown in cross section; Fig. 2 is a cross section taken transversely of the handle and longitudinally of the indicating mechanism; and Fig. 3 is a cross section through a runner which constitutes a feature of the invention, and indicating features thereof which enable the pan of the scoop to be rigidly attached to the handle thereof.

Referring more particularly to the parts, 1 represents the body or pan of the scoop. This pan may be of the form shown, and is pivotally attached at 2 to the forward extremity of an arm 3, which arm is formed integrally with a tubular handle 4. Within the tubular handle there is provided a runner 5, provided on its upper face with teeth 6 so that it constitutes a rack. This runner is guided through an opening 7 in the head of the handle adjacent to the pan, and its opposite extremity is provided with an enlarged head 8 which substantially fits the bore of the handle, as indicated. The extremity of the runner projects beyond the end of the handle and is attached by a pin-and-slot connection 9 to a lever 10 which is pivotally attached at 11 to a lug projecting upwardly from the arm 3. This lever is connected by a link 12 at the rear side of the pan. In the outer portion of the tubular handle, beyond the head 8, a helical spring 13 is provided, one end of which is attached to the head 8 as shown. The opposite end of the spring 13 is connected with an adjusting head 14 which is adjustably mounted upon an adjusting screw 15, the said screw being rotatably mounted in a cap 16 which is attached to the end of the handle as shown. On the outer side of the cap the screw 15 is provided with a head 17 which enables the same to be rotated, as will be readily understood. On the outer side of the cap 16 a bail or loop 18 is attached, which enables the scoop to be hung up when not in use.

I provide an arrangement for locking the runner 5 to the handle. For this purpose, the lower edge of the head 8 is provided with a recess or notch 19, as indicated most clearly in Fig. 3, and this notch is adapted to receive a catch 20 which is pivoted at 21 on the inner side of the handle and lies longitudinally adjacent to the inner face thereof as shown in Fig. 1. Near its pivot point 21 this catch 20 is formed with a tooth or shoulder 22 which is adapted to engage the edge of the notch 19 in the manner shown. The catch is normally held in the operative position shown in Fig. 1 by means of a finger lever 23, the same being formed with a toe 24 which projects inwardly through an opening in the side wall of the handle, the finger lever being pivoted on the outer side of the handle, as indicated. This toe 24 makes a pin-and-slot connection 25 with the end of the catch 20 so that when the tail 26 of the finger lever is depressed, the catch is moved downwardly so as to lie substantially against the wall of the handle. In this way the head 8 is released from the tooth 22.

A small leaf spring 27 thrusts against the tail 26 of the finger lever and normally holds the catch in the position shown.

It should be understood that when a weight is put in the pan 1, it tends to produce a rotation of the pan about the pivot pin 2. In this way the pan is made to pull upon the link 12 and the lever 10, so that the runner 5 is drawn outwardly in such a way as to extend the spring 13.

I provide indicating mechanism 28 for reading the weight in the pan. For this purpose the inner end of the handle 4 is formed with a transversely disposed cylindrical case 29 which may be integral therewith as shown. The upper wall of this case is formed with a longitudinally disposed slot covered by a piece of glass 30, or similar material. Through this slot a tabulated drum 31 is visible, the said drum being mounted upon a longitudinal shaft 32, the extremities whereof are rotatably mounted in the heads of the case 29 as indicated in Fig. 2. The drum 31 is formed in two parts as shown, and between them the shaft 32 carries rigidly a gear wheel 33. This gear wheel meshes with an idler 34, the lower side whereof meshes with the teeth 6 of the runner 5. The entire outer surface of the drum 31 is covered with figures arranged in circumferentially disposed rows. When the drum is standing at the zero position, each of these rows will present a certain price per pound beneath the glass 30. Numbers representing multiples of this price, that is, the cost of two pounds, three pounds, etc., are arranged circumferentially of the drum, so that if the price per pound were fifteen cents and there were two pounds in the pan, the runner 5 would be extended sufficiently to rotate the drum until the number 30 would appear under the glass. In this way it will be evident that a number of different products may be weighed in the pan, and which will be sold at different prices per pound. When there is no weight in the pan, the rear side of the pan rests against the case 29, as indicated in Fig. 1.

Having thus described my invention, I claim as new and desire to secure by Letters Patent:

1. In a weighing scoop, in combination, a pan, a handle having a joint connection therewith, weighing mechanism mounted in said handle and comprising a runner adapted to be extended by a weight placed in said pan, a drum adapted to receive tabulated figures indicating different prices per pound, a spring resisting a movement of said runner and means for driving said drum from said runner.

2. In a weighing scoop, in combination, a pan, a handle having a joint connection therewith, weighing mechanism mounted in said handle and comprising a runner adapted to be extended by a weight placed in said pan, a drum adapted to receive tabulated figures indicating different prices per pound, means for driving said drum from said runner, a spring connected with said runner and means for locking said runner to said handle.

3. In a weighing scoop, in combination, a pan, a handle having a joint connection therewith, a runner slidably mounted in said handle, a connection from said runner to said pan, a spring attached to said runner and adapted to be extended by a weight in said pan, said runner having teeth formed thereon whereby said runner constitutes a rack, a drum adapted to have tabulated figures corresponding to the different prices per pound, and gear wheels rigid with said drum and driven by said runner.

4. In a weighing scoop, in combination, a pan, a handle jointed thereto, a runner slidably mounted in said handle and adapted to be extended by a weight in said pan, said runner having a head formed thereupon, a catch attached to said handle extending longitudinally thereof and having a shoulder adapted to engage said head to lock the same against movement in one direction, a spring connected with said runner and a finger lever movably mounted on said handle and having a pin-and-slot connection with said catch whereby said finger lever may move said catch in and out of engagement with said head.

5. In a weighing scoop, in combination, a pan, a handle having an arm pivotally attached to said pan, a runner slidably mounted in said handle and having teeth thereupon, a lever pivotally attached to said arm and making a pin-and-slot connection with said runner, a link connecting said lever with said pan, a spring attached to said runner and adapted to be extended by a weight in said pan, a transversely disposed case carried by said handle, a drum rotatably mounted in said case and adapted to receive tabulated figures indicating different prices per pound, a gear wheel rigid with said drum, and an idler gear connecting said last gear with said runner.

In testimony whereof I have signed my name to this specification in the presence of two subscribing witnesses.

FRANK C. HOWE.

Witnesses:
H. E. KELLY,
GEORGE CANTRALL.